(12) United States Patent
Despot, Jr.

(10) Patent No.: US 8,504,069 B1
(45) Date of Patent: *Aug. 6, 2013

(54) PROXY SERVER AND METHOD THEREOF FOR FORWARDING LOCATION REQUESTS TO A POSITION DETERMINING ENTITY

(75) Inventor: Pavel Despot, Jr., Cambridge, MA (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,142

(22) Filed: Aug. 17, 2012

Related U.S. Application Data

(63) Continuation of application No. 12/045,745, filed on Mar. 11, 2008, now Pat. No. 8,270,993.

(51) Int. Cl.
*H04W 74/00* (2009.01)

(52) U.S. Cl.
USPC .................................. 455/456.1; 709/239

(58) Field of Classification Search
USPC ................. 455/456.1–456.6; 709/239
See application file for complete search history.

(56) References Cited

U.S. PATENT DOCUMENTS

| | | | |
|---|---|---|---|
| 8,059,665 B2 | 11/2011 | Qu et al. | |
| 2002/0035605 A1 | 3/2002 | McDowell et al. | |
| 2006/0274696 A1* | 12/2006 | Krishnamurthi | 370/331 |
| 2007/0060097 A1* | 3/2007 | Edge et al. | 455/404.1 |

\* cited by examiner

*Primary Examiner* — Marcos Batista

(57) ABSTRACT

A method, system and server comprise forwarding data from a packet data serving node (PDSN) to a server, determining, at the server, an appropriate Position Determining Entity (PDE) to forward the data to based on a network in which a mobile station is roaming and forwarding the data from the server to the PDE.

20 Claims, 3 Drawing Sheets

PROXY SERVER AND METHOD THEREOF FOR FORWARDING LOCATION REQUESTS TO A POSITION DETERMINING ENTITY

CROSS-REFERENCE TO RELATED APPLICATIONS

This application is a continuation from U.S. patent application Ser. No. 12/045,745, filed Mar. 11, 2008, and entitled "Proxy Server and Method Thereof for Forwarding Location Requests to a Position", which is incorporated by reference herein in its entirety.

BACKGROUND OF THE INVENTION

1. Field of the Invention

Methods and apparatuses consistent with the present invention relate to communication between a mobile station and a Position Determining Entity (PDE) via a proxy server. More particularly, in exemplary embodiments of the present invention, the proxy server is operable to receive data from a mobile station, process the data in conjunction with information contained within proxy server databases, and forward/modify, as appropriate, the data to the PDE or block requests based on rules configured within the proxy server.

2. Description of the Related Art

As depicted in FIG. 1, in a wireless communication system or network 100, mobile station 110, such as cellular or PCS telephones with Internet connections, typically transmit packet data over a network by establishing a point-to-point protocol (PPP) with one or more packet data service nodes (PDSN) 120, 130. The mobile station 110 sends packets across an radio frequency (RF) interface, for example, a code division multiple access (CDMA) interface, to a base station or packet control function (not shown). The base station or packet control function establishes the PPP instance with the PDSN 120, 130.

FIG. 1 illustrates a CDMA network 100 as known in the related art. The mobile station 110 is connected to a radio network, Carrier A or Carrier B, through the radio frequency band. In particular, the radio network Carrier A to which the mobile station 110 belongs before traveling may be known as a home radio network, and the radio network Carrier B to which the mobile station 110 belongs after traveling may be known as a target radio network. The radio network Carrier A or Carrier B connects the mobile station 110 with a packet data serving node (PDSN) 120 or 130. Specifically, the PDSN 120 to which the mobile station 110 belongs before traveling may be known as a home PDSN 120, and the PDSN 130 to which the mobile station 110 belongs after traveling may be known as a target PDSN 130. The radio network Carrier A or Carrier B may include a radio base station (not shown) and a base station controller/packet control function (BSC/PCF) (not shown). The radio network Carrier A or Carrier B and the PDSN 120 or 130 allow the mobile station 110 to communicate data over a network, such as the Internet.

In such a wireless communication network, a handover is performed when the mobile station 110 travels to an area managed by the radio network Carrier B and the PDSN 130 while performing data service through the radio network Carrier A and the PDSN 120. If the handover is performed as above, in the CDMA network, the PDSN 120 managing the mobile station 110 before traveling is connected with the PDSN 130 managing the mobile station 110 after traveling, by tunneling. More particularly, in the CDMA network, the handover is performed using a path extension between the PDSNs 120 and 130 through tunneling, without changing the PDSN 120 providing a service to the mobile station 110. That is, after the handover, the mobile station 110 communicates data through the first PDSN 120, the second PDSN 130, and the second radio network Carrier B. The first and second PDSNs 120 and 130 are connected through a tunnel.

When a mobile station 110 initiates a request for information from a Position Determining Entity (PDE) (a PDE request) in a roaming environment as described, the request is forwarded via an existing connection to the mobile station's home radio network, Carrier A. However, one disadvantage in the roaming environment is that it may be difficult to determine the appropriate PDE 140, 150 to which the PDE request should be sent.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for communication between a mobile station and a PDE.

The present invention also provides a wireless communication network, comprising a mobile station, a proxy server, and a PDE.

Further still, the present invention provides a proxy server in a wireless communication network, the proxy server operable to receive, forward, and modify data from a mobile station to a PDE.

According to an aspect of the invention, there is provided a method for communication between a mobile station and a PDE, the method comprising: transmitting data from the mobile station to a PDSN; forwarding the data from the PDSN to a proxy server; and at least one of forwarding and modifying the data from the proxy server to the PDE.

According to another aspect of the invention, there is provided a wireless communication network, comprising: a mobile station operable to transmit and receive data; a proxy server operable to receive the transmitted data from the mobile station and at least one of forward and modify the data; and a PDE operable to receive the data from the proxy server and use the data to determine a location of the mobile station.

According to yet another aspect of the invention, there is provided a proxy server in a wireless communication network, the proxy server operable to receive, forward, and modify data from a mobile station to a PDE, the proxy server comprising at least one of: a subscriber database including information regarding characteristics of the mobile station, the information used by the proxy server to determine whether to forward the data to the PDE; and a network information database including information regarding characteristics of the wireless communication network, the information used by the proxy server to determine a route to forward the data to the PDE.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings.

While the exemplary embodiments of the present invention are described using a code division multiple access (CDMA) mode, the present invention is not limited to that mode. Rather, the present invention, including the novel proxy server, may be applied to operating in one or more of various differing modes, such as an analog mode, a time division multiple access (TDMA) mode, the aforementioned code division multiple access (CDMA) mode, a general packet radio service (GPRS) mode, wideband CDMA (W-CDMA) mode, or universal mobile telecommunications service (UMTS) mode, for example.

Figure 1:
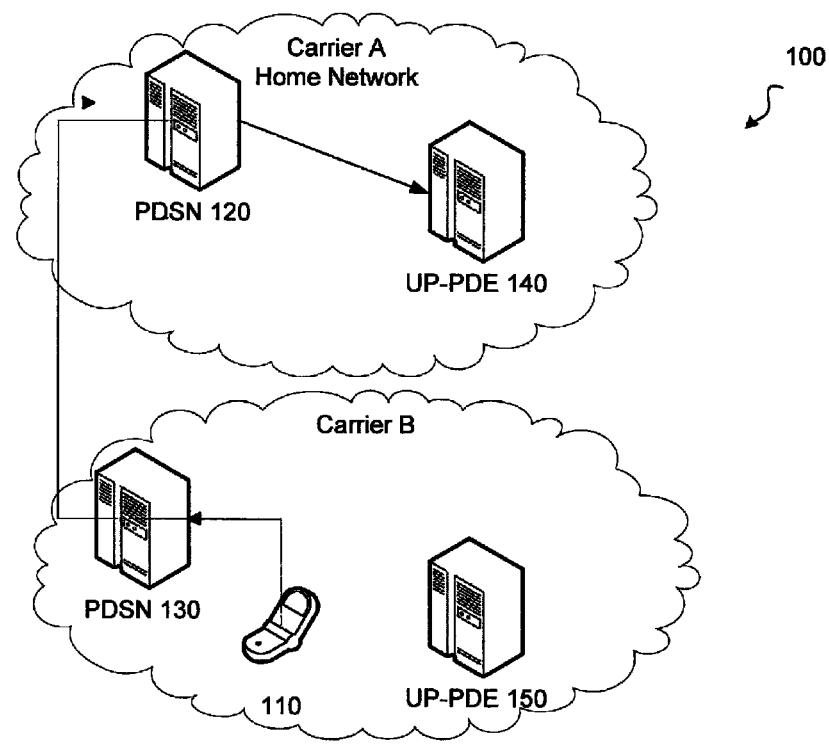
FIG. 1 illustrates a wireless communication system according to the related art.
Figure 2:
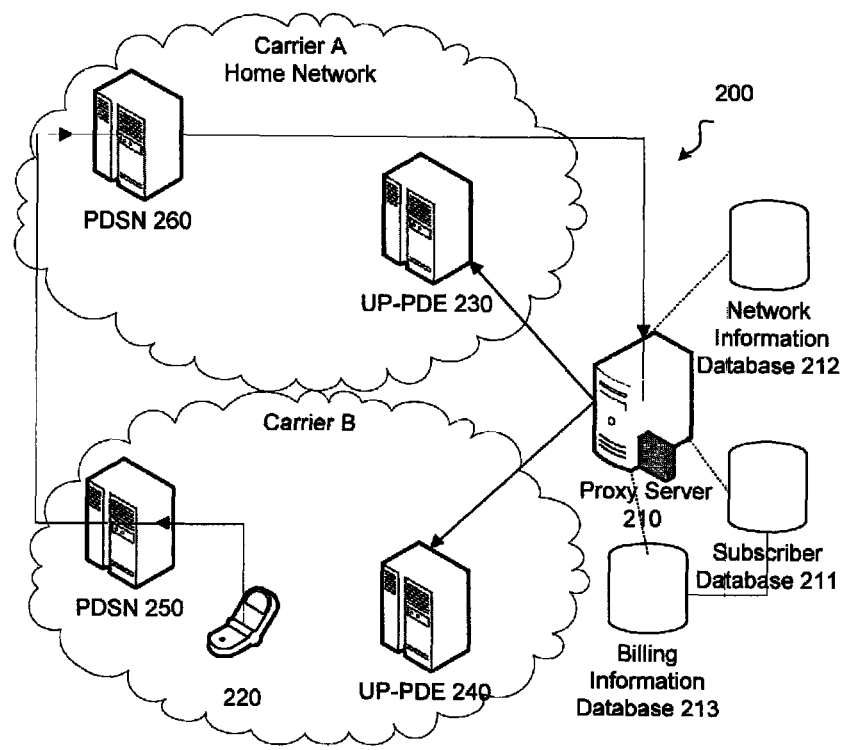
FIG. 2 illustrates a wireless communication system including a proxy server according to an exemplary embodiment of the present invention.

FIG. 2 illustrates a wireless communication system 200 including a proxy server 210 according to an exemplary embodiment of the present invention. As shown in FIG. 2, a mobile station 220 may be located and operate in one of a plurality of radio networks, Carrier A, Carrier B. That is, the present invention relates, but is not limited to, a mobile station in a roaming environment. FIG. 2 depicts mobile station 220 operating within Carrier network B.

When mobile station 220 seeks to query one or more of a Position Determining Entity (PDE) 230, 240 to, for example, locate a position of the mobile station 220, the mobile station 220 "talks" or sends a request to the one or more PDE 230, 240. In exemplary embodiments of the invention, the PDE are known as UP-PDE. Such requests, in the exemplary embodiment of the present invention, may use the IS-801 standard as their protocol.

The request may first be routed to a Packet Data Serving Node (PDSN) 250. The PDSN 250 is responsible for managing point-to-point protocol (PPP) sessions between the mobile station 220 and the mobile station's core or home internet protocol (IP) network, for example, Carrier A.

PDSN 250 subsequently transmits or forwards the request to PDSN 260, located in home radio network, Carrier A. PDSN 260 receives the request from PDSN 250, and then forwards the request to proxy server 210, for example, an IS-801 proxy server.

Proxy server 210 may include a subscriber database 211 and a network information database 212. The subscriber database 211 may include information regarding characteristics of the mobile station 220. This information may include, for example, information on which subscribers are permitted to make PDE requests. In exemplary embodiments of the invention, the PDE requests are known as UP-PDE requests or queries. The subscriber database information may be used by the proxy server 210 to determine whether to forward the request to the appropriate one of the PDE 230, 240.

The network information database 212 may include information regarding characteristics of the wireless communication system 200. This information may include, for example, information regarding where to route requests or queries based on the serving network in which the mobile station 220 is located. It may also include data that is used to identify a particular network's air interface (e.g., SID & NID) as well as a network's IP address range. The information from the network information database 212 may be used by the proxy server 210 to determine a route to forward the request to the appropriate PDE. For example, the request may be routed to a hosted PDE or a carrier's PDE.

Any of the communication networks of the invention may also include components or nodes utilizing aggregation schemes, for example, BSA aggregation. In operation, the proxy server 210 may act as a clearinghouse for location requests between carriers and various applications, such as commercial or 911 related applications. Further, there may be included a database of how networks relate to each other. For example, subs from network A can query network B, but NOT network C. The redirection and authorization operability of the proxy server 210 may allow traffic control between networks and prevent any security, privacy, or spam issues.

In another exemplary embodiment of the invention, a billing information database 213 may be included that prepares billing information based on predetermined characteristics of any or all components of the wireless communication system 200. The billing information database may include information, for example, call records that may be used to determine appropriate billing to the mobile station 220 in a roaming situation.

Figure 3:
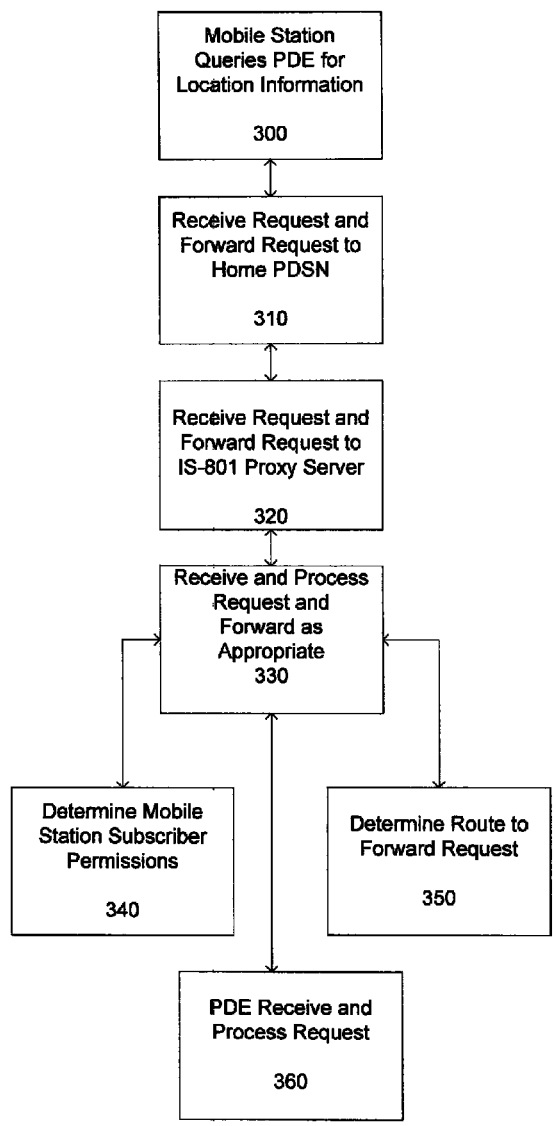
FIG. 3 is a flowchart of a method for communication between a mobile station and a PDE via a proxy sever according to an exemplary embodiment of the present invention.

FIG. 3 is a flowchart of a method for communication between a mobile station and a PDE via a proxy server according to an exemplary embodiment of the present invention.

In the exemplary method according to the invention, a roaming mobile station queries one or more PDE's in order to locate a position of the mobile station. The query or request may be routed 300 to a first PDSN located in a roaming carrier network in which the mobile station is, at the time of request, also located. The first PDSN is responsible for managing PPP sessions between the mobile station and the mobile station's home IP network.

The first PDSN subsequently processes and transmits or forwards 310 the request to a home PDSN, located in a home radio network of the mobile station. The home PDSN receives the request from the first PDSN, and then forwards 320 the request to a proxy server, for example, an IS-801 proxy server.

The proxy sever receives the request, and processes 330 the request. During this processing, the proxy server may identify one or more of the serving network, home network, and subscriber or user of the mobile station.

The proxy server may include a subscriber database and a network information database. The proxy server queries 340 the subscriber database to determine whether or not to forward the request to the PDE based on, for example, permission data related to the user of the mobile station sending the request to the PDE. If a decision is made using the subscriber database to forward the request to the PDE, the request may be forwarded to the PDE by the proxy server. Of course, the request may be modified as necessary before sending. If a decision is made using the subscriber database not to forward the request to the PDE, the proxy server may send a notification message to the mobile station or other component of the communication network.

The proxy server may also query 350 the network information database to determine a route to forward the request to the PDE. First, the proxy server may query the network information database to look up the home and serving network. The network information may include information regarding characteristics of the wireless communication networks, such as information regarding where to route requests or queries based on the serving network in which the mobile station is located. Based on the information, the proxy server may forward 360 the request to the appropriate PDE.

Although a few exemplary embodiments of the present invention have been shown and described, the present invention is not limited to the described exemplary embodiments. Instead, it would be understood by those skilled in the art that changes may be made to these exemplary embodiments without departing from the principles and spirit of the invention, the scope of which is defined by the claims and their equivalents.

What is claimed is:

1. A method, comprising:
    forwarding data from a packet data serving node (PDSN) to a server;
    determining, at the server, an appropriate Position Determining Entity (PDE) to forward the data to based on a network in which a mobile station is roaming; and
    forwarding the data from the server to the PDE.

2. The method according to claim 1, further comprising transmitting the data from the mobile station to the PDSN.

3. The method for to claim 1, further comprising accessing a subscriber database using the server to obtain subscriber information.

4. The method according to claim 3, wherein the subscriber information is used to determine whether to forward the data to the PDE.

5. The method according to claim 1, further comprising accessing a network information database using the server to obtain network information.

6. The method according to claim 5, wherein the network information is used to determine a route to forward the data to the PDE.

7. The method according to claim 1, wherein the PDE is at least one of a hosted PDE and a carrier PDE.

8. The method according to claim 1, wherein the data comprises a request for location information of the mobile station.

9. The method according to claim 1, wherein the mobile station and PDSN are not in a same carrier network.

10. The method according to claim 1, further comprising preparing billing information based on predetermined characteristics of the transmission and forwarding of the data.

11. A network, comprising:
    a server; and
    a position determining entity (PDE);
    wherein the server is configured to:
        receive transmitted data;
        determine the PDE to forward the data to based on a network in which a mobile station is roaming, and
        forward the data to the PDE;
    wherein the PDE is configured to:
        receive the data from the server; and
        use the data to determine a location of the mobile station.

12. The network according to claim 11, wherein the server comprises at least one of a subscriber database and a network information database.

13. The network according to claim 12, wherein the subscriber database comprises information regarding mobile station characteristics, the information used by the server to determine whether to forward the data to the PDE.

14. The network according to claim 12, wherein the network information database comprises information regarding communication network characteristics, the information used by the server to determine a route to forward the data to the PDE.

15. The network according to claim 12, wherein the mobile station is operable to transmit data and receive data.

16. The network according to claim 11, further comprising a packet data serving node (PDSN) operable to receive the data transmitted by the mobile station and forward the data to the server.

17. The network according to claim 16, further comprising a plurality of carrier networks, wherein the mobile station and the PDSN are located in different ones of the plurality of carrier networks.

18. The network according to claim 11, further comprising a billing information database operable to prepare billing information based on predetermined characteristics of the transmission of the data.

19. The network according to claim 11, wherein the data comprises a request for location information of the mobile station.

20. A server in a wireless communication network, the server operable to receive and forward data from a mobile station to a Position Determining Entity (PDE), the server comprising at least one of:
    a subscriber database including information regarding whether the mobile station is permitted to make PDE requests, the information used by the server to determine whether to forward the data to the PDE; and
    a network information database including information regarding characteristics of the wireless communication network, the information used by the server to determine an appropriate PDE to forward the data to based on a network in which a mobile station is roaming.

* * * * *